May 3, 1927.
J. A. BURNHAM
1,627,270
MEANS FOR REPRESENTING CASCADES IN LANDSCAPES
Filed March 6, 1926
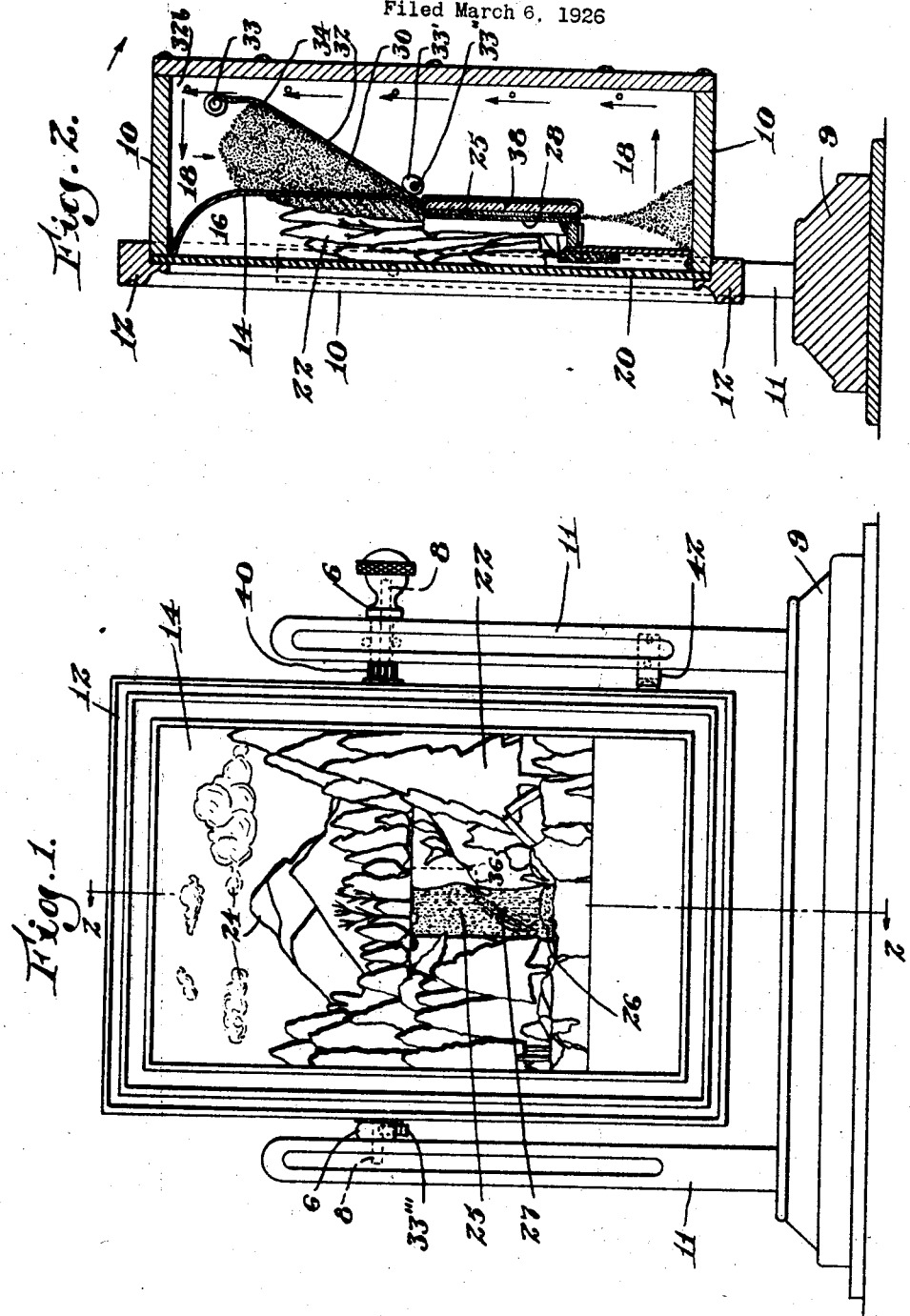
Inventor
John A. Burnham
by Mitchell, Chadwick & Kent
Attorneys Patented May 3, 1927.

1,627,270

UNITED STATES PATENT OFFICE.

JOHN A. BURNHAM, OF MARBLEHEAD, MASSACHUSETTS.

MEANS FOR REPRESENTING CASCADES IN LANDSCAPES.

Application filed March 6, 1926. Serial No. 92,787.

This invention relates to improvements in means for representing a cascade. More especially it relates to a device in which a live water fall, fountain out of rock, or the like, may be embodied in a scenic representation, or a miniature reproduction, of landscape, whereby a realistic simulation of nature's beauty spots is made possible. When so embodied the invention becomes particularly appropriate as an attractive and appealing window display for tourist agencies and the like, and for other commercial uses, and as a work of art.

The scenic beauty found in numerous of nature's playgrounds cannot be appreciated fully without actual seeing. A better appreciation by the general public of these natural reservoirs of scenic beauty unquestionably would have a tendency toward stimulating travel to these points. Photographs and paintings fall far short because they are necessarily still, in their showing of a scene in which the key feature is water in action. By such portrayals the real beauty is greatly diminished. It is the object of the invention to provide so that falling water may be simulated in the midst of a reproduction of scenery whose still portions may be painted or may include miniature rocks, trees, etc., in relief, to the end that a realistic and live representation of a desired landscape may be had. An important feature resides in the details of structure whereby the substance which produces the illusion of falling water is realistic in producing the aspect of water falling at a little distance while another lies in the device for keeping the scenery fresh, by segregating the same in a compartment separate from that occupied by said substance, and providing a clear glass thin wall of the said compartment through which the "water" is seen and by which the substance composing it is separated from the scenery. A further feature resides in the provision of means for controlling and regulating the flow of the simulated falling water.

The object and the features which characterize the illustrated structure are gained by causing a suitable substance to cascade behind an opening in the scenery covered by a thin sheet of transparent material, preferably clear glass, which is tightly secured in a substantially vertical position. This is accomplished by providing a partition arranged so as to divide the interior of the device as a whole into front and rear compartments. Forward of this partition the scenic representation of landscape is provided, partly in relief and partly painted on the walls and partition of the device, suitable representations of rocks, ledges and trees being made around the invisible glass sheet, so as to indicate the diversity of elevations which attend a water fall. A second sheet, which may be of bluish cathedral glass or may be a suitably painted wall, may be arranged in the rear compartment, behind, parallel to and slightly spaced from the transparent sheet, thus constituting both a guide for the material of the cascade when it is running and a still simulation of the cascade when the living fall is not in action. For the latter, water or other ordinary liquid will not serve, but I have discovered that a powdered dry white solid can be used successfully. In large dimension embodiments of the invention I believe that a fine foam will serve, if forced to move rapidly.

The narrow passage provided between the two spaced sheets extends downward from the throat of a supply container from which the powdered white solid is slowly released, to become visible to the beholder in front as it falls behind the transparent sheet. The lower end of the passage is open, into the bottom part of the rear compartment. Thence the fallen substance may be returned to the supply container in any desired manner. A damper or shutter may be provided in the throat of the container for restricting and controlling the flow of the falling substance into the passage. The front compartment may preferably be closed by a protecting face plate of glass. The rear compartment preferably has walls which conceal its interior from view.

The invention is adaptable to varied uses, one of which is illustrated in the accompanying drawings. It is intended that the patent shall cover by suitable expression in the appended claims whatever features of patentable novelty exist in the invention disclosed.

In the drawings:

Figure 1 is a front elevation of a device showing the invention embodied in apparatus adapted to stand on a shelf or table;

Figure 2 is an elevation in section on line 2—2 of Figure 1.

Referring to the drawings a rectangular casing 10 is so mounted in a supporting frame 12 as to be capable of rotation on a shaft 8 supported in bearings 6 on uprights 11 rising from a base 9. The interior of the casing is divided by a substantially vertical partition 14 into front and rear compartments 16, 18, respectively. The front of the former is closed by a transparent glass plate 20; and the latter is completely enclosed in a manner to conceal its interior. In the front compartment 16 and visible through plate 20, scenery 22 in relief is suitably arranged so as to combine with painted scenery 24 on partition 14 to provide a desired landscape. The scenery 22 may include miniature trees, rocks, etc., while mountains, clouds, etc. may be conveniently incorporated by painting them on partition 14 in their proper relation to the miniature objects.

Water as at the foot of a cascade 25 is represented at 26; and it is to improved means for simulating the cascade that the invention more particularly relates. To this end the partition 14 contains a thin sheet 28 of glass, inserted in an opening formed in partition 14 at the place where the cascade is to appear; and it is important that the said opening be completely sealed. The medium for representing the falling water is thus securely maintained in the rear compartment while the visual effect of its cascade is seen with the contents of the front compartment. The said medium consists preferably of a finely divided, non-cohesive white solid 30. Minute white glass beads are preferable in this capacity, although a selected white sand or powder has been used with good effect. The smooth universally rounded surfaces of the fine glass globules produce for them a uniformity of flow, with discontinuity and free movement of individuals in the mass, which with the reflection of light from each, strikingly simulates the effect of foam in a waterfall. The current of finely divided solid particles as shown at 25, issues at a restricted rate from the throat of a container 32 arranged in the upper portion of the rear compartment. In aspect the cascade may express any of a wide range of ideas which the art of the designer may conceive. For example, in Figure 1, in addition to the main cascade 25 there is a lateral cascade 27, accomplished by providing at a suitable point an obstruction 36, seen in dotted lines in Figure 1, in the path of some of the cascading substance which is falling behind the scenery, so as to divert it when part way down so that the diverted flow first appears to view as at 27. If desired a shutter may be employed for controlling the degree of restriction to which the flow from the container is subject. While this may be arranged in any suitable way it is here represented by showing the rear wall 34 of the supply container 32 as being supported on a pin 33 and adjustable in position by a cam 33' on a shaft 33" having a control knob 33'''.

A back wall for the cascade passage indicated at 38, comprises a sheet which serves as a simulation of the cascade when the latter is not operating. This may be blue cathedral glass, arranged parallel to and slightly spaced from the clear glass sheet 28. The powdered white substance falls between these two spaced sheets and discharges into the bottom of the rear compartment 18.

In Figure 2 the supply container 32 is shown as having its rear wall 34 considerably spaced from the rear wall of the rear compartment 18, and not rising to the top thereof. This device lends itself to the quick replenishing of the supply. The apparatus illustrated can be set for operation of the cascade by rotating the casing in the direction indicated by the arrow at the upper right hand corner, turning it about its supporting shaft 8, through 360°. This movement causes the substance which has fallen to the bottom of the rear compartment 18 to slide freely along the bottom, thence along the rear wall of the casing 10, and thence along its top and past the top of the supply container wall 34 into the container 32. Ratchet mechanism 40 may be employed to prevent the turning of the casing 10 in the wrong direction; and a latch 42 to indicate and hold the casing in correct vertical position for operation of the cascade after each said turning. Any suitable mechanical means (none being shown) may be provided for intermittently turning the casing 10; and it should be understood that other means for replenishing the container, such as a power conveyer or the like within a stationary non-rotatable casing may be used in cases where the device is built upon a sufficiently large scale, as for window display, as for example, for continuous operation in the display window of a tourist ticket agency.

I have found that in the smaller sizes of this device common water cannot successfully be used to simulate the cascade. But by introducing an aspect of discontinuity between adjacent particles I have made the same successful as a representation of water by use of a quasi-fluid cascading substance such as a finely divided solid. The powder must be non-hygroscopic to the extent that its particles do not adhere together. And the liquid, if a liquid be used should have such infinitesimal skin tension that its bubbles or drops will separate likewise or will appear to do so because of the pressure of an infinitude of extremely small lights and shadows, which may occur in the case of such finely divided foam that an aspect of discontinuity appears in adjacent particles, these being too small to be readily separated by the eye of the beholder, coupled with sufficient density to fall rapidly. In a large sized apparatus this can be accomplished much more perfectly than in a small one, because the skin tension of the liquid does not favor the division of the liquid into extremely small masses. If a liquid is used continuous circulation can be maintained by use of a suitable small pump.

In either case the clear glass 28 maintains inviolate the incidental scenery, set around the cascade, notwithstanding the inversions of the casing and the violent movements otherwise of particles of the water-simulating substance, without which protective element 28 the scenery will quickly lose its realistic aspect.

I claim as my invention:

1. In a device for representing a landscape which includes a cascade, the combination, with incidental scenery, of means for simulating the cascade, comprising a white substance adapted to fall by gravity past an opening in the scenery; and a transparent partition at said opening separating the said scenery and the falling substance whereby both are visible as parts of one whole although maintained always physically apart; there being a container divided into a front compartment, containing said scenery and a rear compartment containing said substance; and there being a circuit passage provided in the latter for the substance, comprising means for guiding the falling substance past the said opening, and for guiding its return to the top by a course which avoids the said opening.

2. In a device for representing a landscape which includes a cascade, the combination, with incidental scenery, of means for simulating the cascade, comprising a mass of minute glass beads; there being an opening in the scenery; and means for holding said mass above the opening and adapted to discharge, by gravity, a thin, flat stream of said beads past the opening.

3. In a device for representing a landscape which includes a cascade, the combination, with a wall having incidental scenery associated therewith on its front side and having an opening, of means for simulating the cascade, comprising a white substance falling past in rear of said opening; a container for said substance; and a transparent partition constituting a guide flattening the falling stream at said opening and constituting a barrier separating the said scenery and the falling substance whereby both are visible as parts of one whole although maintained always physically apart.

Signed at Boston, Massachusetts, this first day of March 1926.

JOHN A. BURNHAM.